No. 632,178. Patented Aug. 29, 1899.
A. W. & F. D. ENGLAND & C. L. RANDOLPH.
HARROW.
(Application filed Mar. 7, 1898.)
(No Model.) 4 Sheets—Sheet 4.

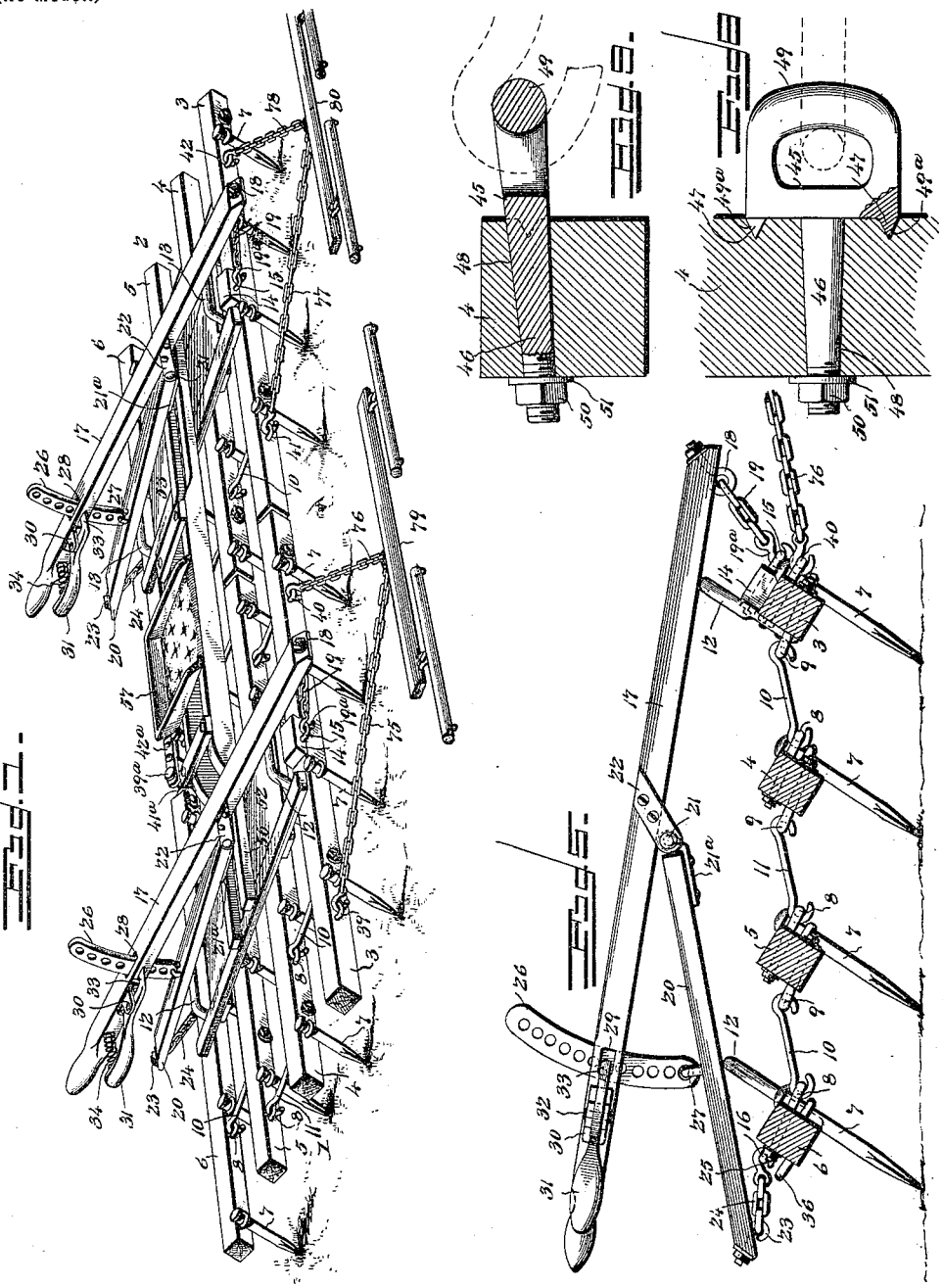

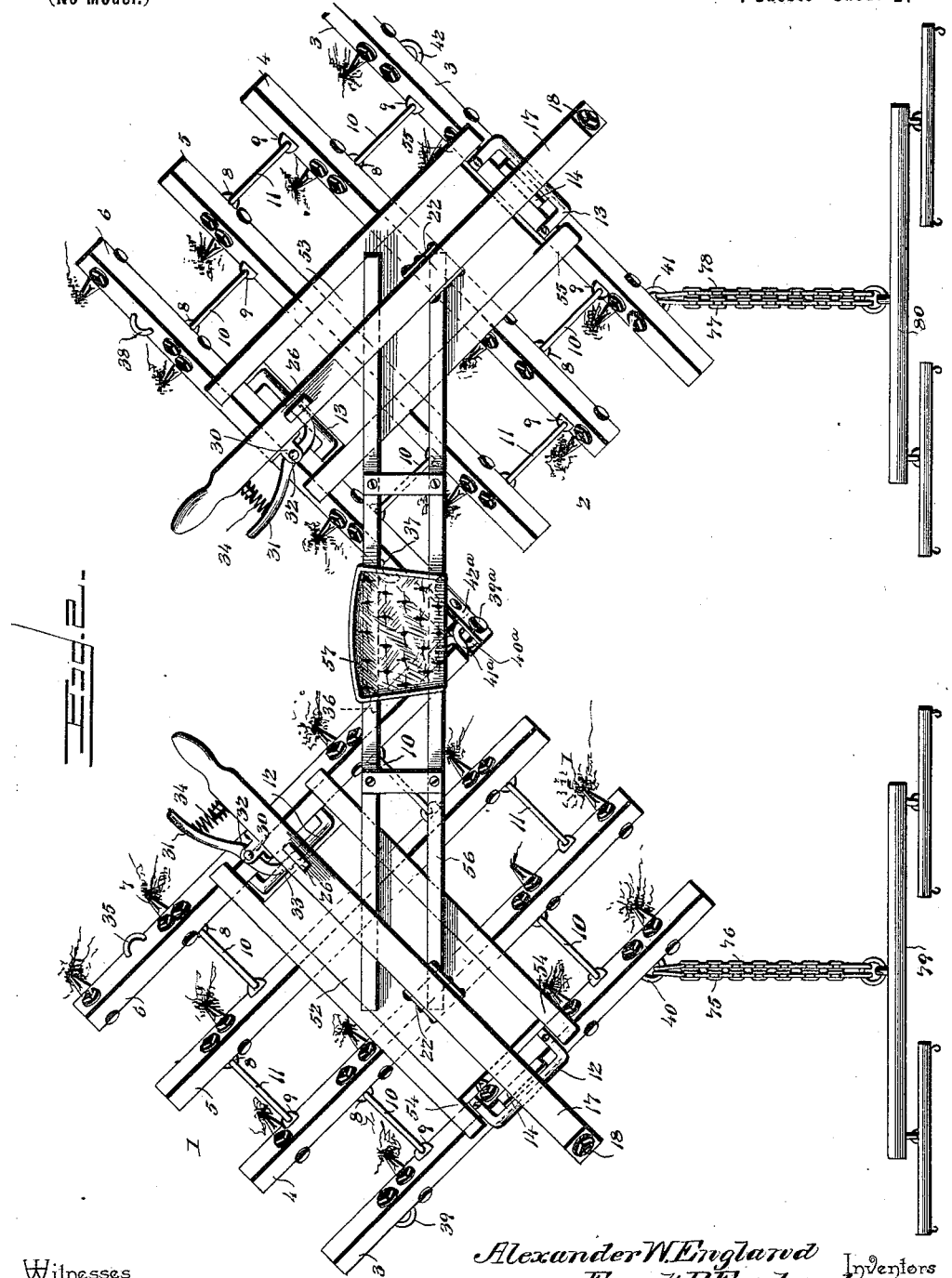

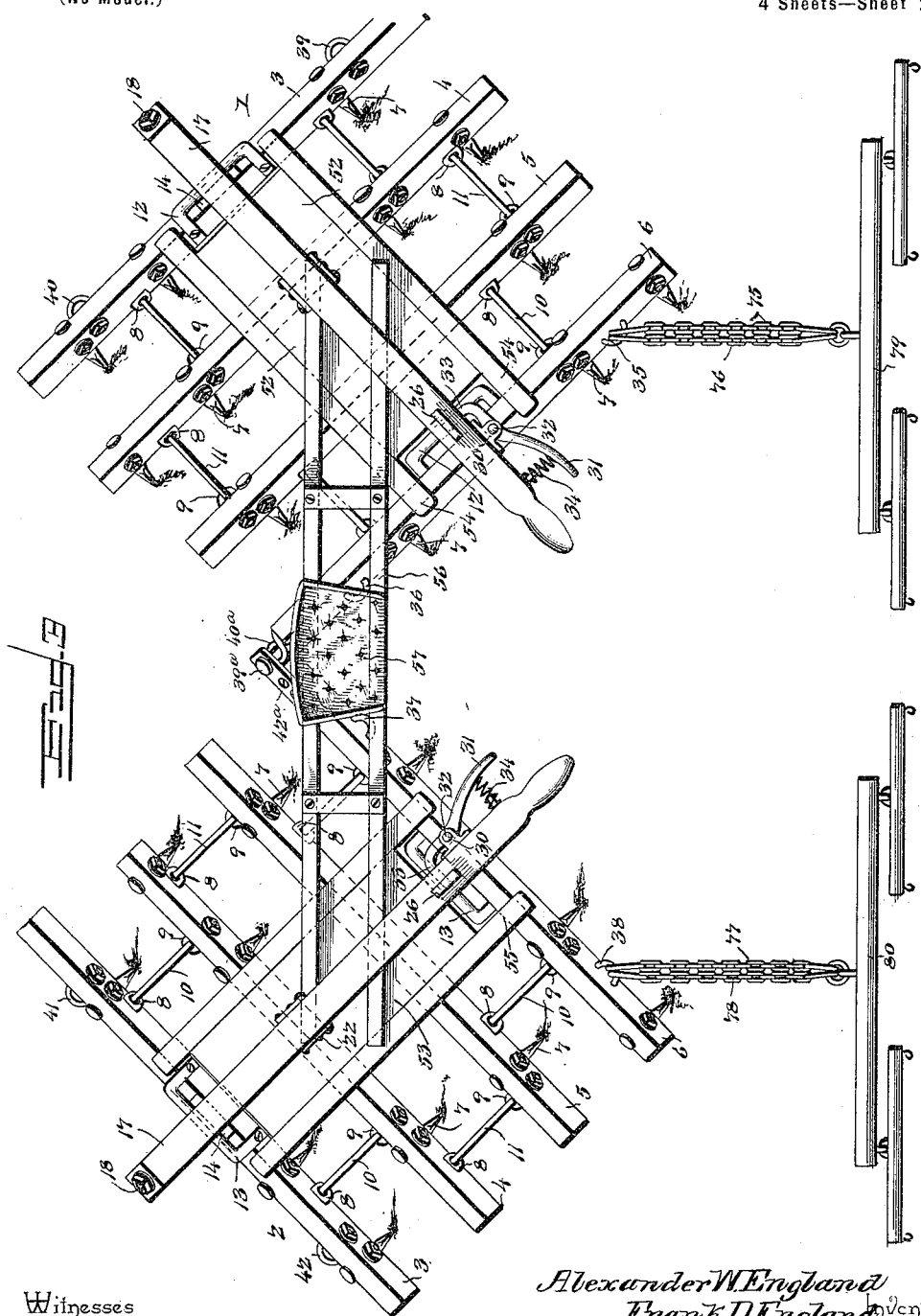

Witnesses
E. K. Stewart
H. F. Beaubert

Inventors
Alexander W. England
Frank D. England
Coleman L. Randolph
By their Attorneys,
C. A. Snow & Co.

THE NORRIS PETERS CO., PHOTO-LITHO., WASHINGTON, D. C.

UNITED STATES PATENT OFFICE.

ALEXANDER W. ENGLAND, FRANK D. ENGLAND, AND COLEMAN L. RANDOLPH, OF COLUMBIA, TENNESSEE.

HARROW.

SPECIFICATION forming part of Letters Patent No. 632,178, dated August 29, 1899.

Application filed March 7, 1898. Serial No. 672,896. (No model.)

*To all whom it may concern:*

Be it known that we, ALEXANDER W. ENGLAND, FRANK D. ENGLAND, and COLEMAN L. RANDOLPH, citizens of the United States, residing at Columbia, in the county of Maury and State of Tennessee, have invented a new and useful Harrow, of which the following is a specification.

Our invention relates to improvements in harrows; and the leading or primary aim that we have in view is to provide for several adjustments of a duplex harrow to meet the demands of the service in breaking up different kinds of soil, as well as for cultivating the crust of the ground planted with corn or other crops before and after the crop makes its appearance through the soil.

According to our invention we provide a simple construction of the harrow which may be adjusted to either of several positions to meet the demands of the farmer in treating large or small tracts of land or for cultivating purposes, and in one adjustment of the implement it answers for pulverizing lumpy or clogged ground containing a large quantity of trash or refuse, and in another position or adjustment for destroying vegetable growths in one drive across the field, and in another position for pulverizing extremely tight, lumpy, and heavy sod, and in its final adjustment for pulverizing the crusty soil of ground planted with the crop.

A further object of the invention is to provide for connecting the draft appliances and the duplex harrow-sections together in a manner to insure the several adjustments of the harrow to suit the requirements of the service for which the implement is or may be used.

A further object of the invention is to provide an improved draft-eye capable of sustaining the draft when a number of horses are used and which serves to give the proper set to the toothed bars of the implement.

A further object of the invention is to provide means by which the necessary weight may be applied to a harrow when it is used for breaking up the ground, but which weight appliance is readily removable when the implement is used for cultivating purposes.

A further object of the invention is to provide an improved tension device by which the angle of the toothed bars may be changed to suit the service, and finally to simplify and strengthen the construction and render the implement durable in service.

With these ends in view our invention consists in the novel combination of elements and in the construction and arrangement of parts, which will be hereinafter fully described and claimed.

To enable others to understand the invention, we have illustrated the preferred embodiment thereof in the accompanying drawings, forming a part of this specification, and in which—

Figure 1 is a perspective view of our improved harrow, illustrating the sections thereof adjusted and with the draft appliances connected to the implement for service in one position. Fig. 2 is a plan view of the implement, illustrating another adjustment of the harrow. Fig. 3 is a plan view of the parts in Figs. 1 and 2, illustrating a still further adjustment of the harrow, and Fig. 4 is another perspective view illustrating a further adjustment of the harrow. Fig. 5 is a vertical sectional view taken longitudinally through one of the harrows or a section thereof, illustrating the improved tension device in side view. Figs. 6 and 7 are detached views of weight-platforms which may be used on the harrows or harrow-sections either individually or collectively. Fig. 8 is a detail sectional view of the improved draft-eye; and Fig. 9 is a vertical transverse section through one of the toothed bars or beams, illustrating the draft-eye applied thereto. Fig. 10 is a view of a construction of the toothed bar which we prefer to employ when said bar is made of metal. Fig. 11 is a detail of one means for securing the harrow-tooth to a wooden beam or bar, and Fig. 12 is an enlarged detail view of the hinged connection between the end bars of the adjacent harrows or sections thereof. Fig. 13 is a detail perspective view of one plate in the tooth-clamp shown by Fig. 11.

Like numerals of reference denote like and corresponding parts in each of the several figures of the drawings.

In the embodiment of our invention as illustrated by the accompanying drawings we employ the duplex harrows 1 2 or, as they may be termed, the "sections" of a complete harrow. When the two harrows are coupled together, they constitute a complete implement capable of a variety of adjustments to meet the demands of the service in pulverizing different kinds of soil or for cultivating small crops; but the harrow-sections are detachable one from the other for the purpose of using them individually. The individual harrow-sections are adapted for use to good advantage when a small tract of ground is to be pulverized or cultivated; but for cultivating or breaking up large tracts of ground it is desirable to employ the sections or harrows collectively to save the time and labor of the attendants and teams.

Each harrow 1 2, or the section of a complete harrow, consists of a series of bars or beams, (indicated at 3, 4, 5, and 6,) and each beam or bar is provided with a plurality of teeth which may be embedded in the bar or be clamped rigidly thereto, one form of clamping device for each tooth being shown by Fig. 11 of the drawings and hereinafter more fully described. While we have illustrated each harrow as consisting of a series of four beams or bars, we do not limit ourselves to the number of beams or bars which are to be used in the construction of the harrow, because we may use three, four, or five bars, as may be desired. The tooth forming one of the series of teeth on each edge of the bars or beams is indicated by the numeral 7; but it will be understood that harrow-teeth of any suitable or preferred construction may be used, as no novelty for the teeth *per se* is claimed in this application. Each bar or beam is provided with two pairs of draft-eyes 8 9, which are set in or attached to the bar or beam in alternate relation to each other—that is to say, they do not lie in the same vertical plane transversely across the beam. The pair of eyes 8 for each beam extend from one side of said beam, while the other pair of eyes 9 extend from the opposite side of the beam. The adjacent draft-eyes forming one pair near each end of the beam are set in or attached to said beam in different elevations—that is to say, the draft-eye 8 is on a plane above the horizontal plane of the draft-eye 9, and according to our invention each draft-eye is arranged in an inclined or oblique position to the transverse axis of the bar or beam. By attaching the draft-eyes to the bars or beams in the manner described they are arranged in proper relation to similar draft-eyes on adjacent bars or beams for the connection of the links of said draft-eyes, and said links and draft-eyes serve to transmit the draft, secure proper set to the bars, and allow the toothed bars to have individual movement or play under certain conditions in the practical service of the implement. The links 10, which connect the draft-eyes of the bar 3 to the draft-eyes of the beam 4, are looped or loosely connected to the draft-eyes 8 9, while the links 11, which connect the two middle beams 4 5, are out of line with the links 10, heretofore described. All the links used in the construction of the harrow are preferably looped in the draft-eyes; but the particular way of connecting the links to the draft-eyes is not material and may be changed at pleasure.

To the upper side of the beam 3 of each harrow or section thereof is rigidly secured a block 14, and to this block is secured the shank of an eyebolt 15. The other beam 6 of the harrow is provided with an eyebolt 16, which is rigidly secured thereto in a suitable way, and with the two eyebolts 15 16 is combined the tension device, the construction of which will now be described.

The tension device consists of a suitable bar or lever which is provided at one end with a handle adapted to be grasped by the operator in adjusting the toothed bars of the individual harrows or sections, and at one end this tension-bar is equipped with an eyebolt 18, which is suitably fastened to the extremity of the bar, and to the eye of which bolt is connected the upper extremity of a chain 19. The other end of this chain is provided with a suitable hook-shaped link 19$^a$, adapted to be detachably connected to the eyebolt 15 on the block 14 of the beam 3. An arm or bar 20 has one end pivotally connected to the tension-bar 17 at a point intermediate of the length of the latter, and this hinge or pivotal joint between the arm 20 and the tension-bar is preferably formed by a pintle or bolt 21, which is fitted in the eye or loop of a suitable plate 21$^a$ and passes through alined openings in plates 22. The plate 21$^a$ is fastened rigidly to the under side of the arm 20, while the plates 22 are securely fastened to the opposite sides of the tension-bar 17 at a point intermediate of the length thereof, and as the pintle or bolt 21 passes through the two plates the arm or lever 20 is joined to the tension-bar by a suitable hinge connection. The arm 20 lies below the tension-bar for a part of the length thereof, and it occupies an angle to said tension-bar, the angular disposition of the tension-bar and the arm depending upon the adjustment which it is desired to impart to the tooth-carrying bars of the harrow-section. At its free end the arm 20 is provided with an eyebolt 23, suitably secured thereto, and to the eye of said bolt is connected one end of a chain 24, the other end of which is provided with a hook-shaped link 25, adapted to be detachably connected to the eyebolt 16 of the beam 6.

Our tension device is arranged from front to rear over the central part of the harrow or section 1 or 2, as the case may be, and the bar 17 and the arm 20 rest upon the loop-shaped brackets, which will be hereinafter more fully described and which form a rest or support for the tension-bar and its arm. It will be observed that the hook-shaped links of the chains which are attached to the respective ends of the tension-bar 17 and the arm 20 thereof serve to detachably connect said parts to the end beams or bars of the harrow or harrow-section, and under certain conditions in the service of the implement the tension-bar and its arm may be disconnected from said beams, reversed or turned end for end with relation to the harrow, and the chains again connected to the eyebolts on the beams at the front and rear of the implement. The arm 20 and the tension-bar are adjustably but rigidly held in their several positions of adjustment by the devices represented more clearly in Fig. 5 of the drawings.

26 designates a holding-segment which is arranged in a vertical position through a slot 28 in the tension-bar 17, and the lower end of this segment is hinged or pivotally connected to the arm 20 by means of a staple 27, which is fastened in the arm 20 and on which the holding-segment is capable of a limited swinging or pivotal movement. To one side of the tension-bar 17 is rigidly fastened a fulcrum-plate 30, between the ears of which is fulcrumed a locking-lever 31 by a vertical pin or bolt 32, which passes through the ears of said plate and the lever at a point between the ends of the latter. The locking-lever is provided at one end with a nib or arm 33, which is adapted to play in a transverse slot 29, that is formed horizontally in the tension-bar in a plane to intersect with the vertical slot 28, that accommodates the holding-segment 26. This holding-segment is provided at intervals throughout its length with a vertical series of transverse apertures, into either one of which may be fitted the prong or arm 33 of the locking-lever 31, according to the adjustment of the tension-bar with relation to the arm and the harrow, and this locking-lever is held in engagement with the perforated segment 26 by a coiled spring 34, which is seated or held on the tension-bar by a suitable stud, one end of the spring pressing against the tension-bar and its other end acting against the handle-formed end of the lever to normally press the nib or arm 33 into engagement with one of the apertures of the segment 26. The described construction of the rocking lever enables the operator to readily retract the nib or arm 33 from the holding-segment to raise or lower the lever and through the described connections adjust the several bars of the harrow or harrow-section, after which the locking-lever is released and the spring forces its arm or nib into engagement with the frame-bar. Provision is thus made for readily changing the position or set of the toothed bars of the harrow, and the device is simple and durable in construction and easily operated by one end. It is also apparent that the tension device may be adjusted when the implement is in motion, thus overcoming any necessity for stopping the team previous to adjusting or changing the positions of the toothed bars.

By reference to Fig. 5 of the drawings it will be seen that the eyebolt 15, supported in the block 14 of the beam 3, is in a different horizontal plane from the eyebolt 16 in the other beam 6, and this variance in the positions of the eyebolts on the front and rear beams corresponds to the difference in elevation between the eyebolts 8 and 9 of the toothed beams. This is an important feature in the practical construction of our harrow, because it maintains equilibrium in the draft and insures corresponding setting of all of the beams forming the improved harrow.

In using the harrow in its completed condition we pivotally connect the beams of the two sections at their adjacent corners and provide the individual harrows with a plurality of draft-eyes. The beams 6 of the two harrow-sections are provided with draft-eyes 35, 36, 37, and 38, of which draft-eyes the eyes designated as 35 36 are attached to the beam 6 of the harrow 1, while the draft-eyes 37 38 are attached to the beam 6 of the harrow 2. As it is necessary to reverse the harrows in pulverizing some kinds of soil, we provide the beams 3 with a like series of draft-eyes corresponding in number and position to the draft-eyes on the beam 6, and of the second series of draft-eyes the eyes designated 39 and 40 are attached to the beam 3 of the harrow-section 1, while the draft-eyes 41 and 42 are attached to the beam 6 of the harrow 2. The beams 6 of the two harrow-sections are pivotally connected together by a peculiar form of hinge-joint, and the inner end of one of the beams 6 of one harrow-section is beveled or chamfered, as at $38^a$. The pintle or bolt $39^a$ of the hinge connection is situated about midway between the beveled or chamfered end of one beam 6 on one harrow-section and the end of the beam 6 on the other harrow-section adjacent to said beveled end $38^a$, and said bolt passes through the eye $40^a$ of the clevis $41^a$, which is fastened to the beam 6 of the harrow-section 1 and also through perforated plates $42^a$, which are secured to the upper and lower sides of the corresponding beam 6 of the harrow-section 2. It will be observed that the vertical pintle is midway between the two harrow-sections, which permits the sections to be adjusted at the required angles when the harrow is to assume the diagonal or diamond shape represented by certain figures of the drawings, and this bolt or pintle $39^a$ is readily removable from the clevis and hinge-plates to permit the harrow-sections to be uncoupled or detached when it is desired to use the sections as individual harrows. The eye-formed end $40^a$ of the clevis $41^a$ is fitted loosely on the vertical pintle or bolt $39^a$, and it is adapted to play idly on said bolt and between the spaced hinged plates for the purpose of permitting the beam 6 of one harrow-section to play independently in a vertical direction of the corresponding beam of the other harrow-section when the harrow is drawn over uneven or rough ground, and thereby obviate binding of the parts of the two harrows or sections. It will be noted that the clevis 41ª straddles or embraces the end of the beam 6, forming a part of the harrow-section 1, and that said clevis is secured rigidly to said end of the beam by a transverse bolt, as represented by Fig. 12 of the drawings.

The draft-eyes which we employ for the attachment of the draft-chains to the end bars of the harrows, as well as for the attachment of the links which unite the individual bars together in series to form the harrow, are of the peculiar construction illustrated by Figs. 8 and 9. Each draft-eye is cast in a single piece of metal with a comparatively heavy body 49, which is tapered somewhat in a transverse direction and provided at one side with a flat face. This cast-metal draft-eye is provided with an integral shank 46, which extends from the body for a suitable distance and occupies a central position thereon, and on opposite sides of said shank 46 are arranged the locking-studs 47, which are made as an integral part of the body 45 and extend from the straight rear face of said body. The draft-eye of our invention is not attached to the toothed bar or beam of the harrows in a plane parallel to the axis of said bar or beam; but we arrange this draft-eye to assume an inclined or oblique position through the bar or beam. This end is attained by boring a hole or passage 48 through the bar in a position oblique to the axis of said bar, and through this hole or passage 48 is thrust the stem or shank 46 of the draft-eye to cause the latter to assume the inclined angular or "oblique" position, as it may be termed. On opposite sides of the angular hole or passage 48 in the toothed bar are provided the sockets 49ª, adapted to receive the locking-studs 47 of the draft-eye, and these studs fit snugly in the sockets to hold the draft-eye against displacement or turning on the stem or shank 46 as the axis of movement of the draft-eye. The rear extremity of the stem or shank 46 protrudes from the opposite face of the toothed bar against which the draft-eye is applied, and said protruding extremity of the stem or shank is externally threaded to receive a clamping-nut 50, that binds against a washer 51, which is interposed between the nut and the toothed bar or beam. The draft-eye presents a strong and substantial construction adapted to withstand the strain or pull of the draft-animals employed in the practical operation of our improved implement, and said draft-eye is attached to the bar or beam of the implement in an exceedingly secure and simple way to wholly overcome any tendency of the draft-eye to work loose on its connection with the bar or beam.

A harrow, having its two sections pivotally connected together at one side thereof in the manner described and equipped with the series of draft-eyes 39, 40, 41, and 42 is capable of adjustment to the position represented by Fig. 1 for the purpose of producing an oblong harrow especially well adapted for pulverizing lumpy or cloggy ground obstructed by accumulations of trash. In order to adapt the implement for working in ground of this character, the draft-chains 75, 76, 77, and 78 are connected to the draft-eyes, as represented by said Fig. 1, on the side of the harrow opposite to the pivotal connection 39ª between the rear beams 6, and the adjacent ends of the bars or beams 3, 4, 5, and 6 of the two harrow-sections are adapted to abut endwise against each other. The harrow adjusted as described and as represented by the figure referred to has its teeth 7 inclining rearwardly, and the draft-chains 75 and 76 are connected to the draft-eyes 39 and 40 of the beam 3, forming a part of the section 2, while the other draft-chains 77 and 78 are attached to the draft-eyes 41 and 42 of the beam 3, forming a part of the other harrow 1. The beam or draft chains 75 76 converge toward each other and are connected to the doubletree 79, while the other pair of draft-chains 77 78 are connected to the draft-eyes 41 42 of the other harrow-section, and they converge toward each other to be attached to the doubletree 80. The doubletrees 79 80 are thus individually connected by a pair of draft-chains to the respective sections of the harrow, and thus each section of the harrow is drawn by one team. A harrow thus adjusted and equipped is especially well adapted for pulverizing soil of the character referred to, and in this connection it is desirable or necessary to depress or weight the harrow in order to hold the teeth to their work. We have devised novel means for weighting the harrow which consists of the weight-platforms 52 53, one of which is applied to each individual harrow-section across the center line thereof. Each weight-platform 52 or 53 is provided with the arms 54 55, which project from the respective ends of said platform at the sides thereof, and said arms of the weight-platform are engaged with the looped rests or keepers 12 13, which are fastened to the end bars or beams of each harrow-section to extend a suitable distance above said end bars or beams and form rests for the tension-bar 17 and its arm 20, hereinbefore referred to. The looped rests 12 13 are made from pieces of metal bent to the proper form and rigidly fastened to the respective bars or beams at the front and rear of each harrow-section, and said looped rests thus serve the double purpose of supporting the tension device and of holding the weight-platforms against edgewise or lateral displacement of their central position on the harrow-sections. In connection with the transversely applied weight-platforms on the individual harrow-sections we employ a longitudinal platform 56, which is arranged lengthwise of the implement formed by the two alined and connected sections 1 2 and which platform 56 rests at or near its ends upon the transverse platforms 52 53. This longitudinally-disposed platform 56 is thus sustained in the direction of the length of the implement by the transverse platforms 52 53, and at its middle it is provided with a support or seat 57 for the driver. The driver occupies a position substantially over the meeting line of the adjacent harrow-sections, and the weight of the driver is uniformly distributed on and applied to the individual harrow-sections because of the longitudinal disposition of the platform 56 and the transverse disposition of the platforms 52 53. A harrow constructed and arranged as described is of large capacity for rapidly and thoroughly pulverizing soil which is filled with clods and accumulations of trash, and the draft is applied to the harrow to the best advantage, and the weight is distributed to maintain each harrow-section in proper relation to the ground.

When the land is run together by a medium vegetable growth or sod or when broken soil is sowed with wheat or oats followed by a voluntary outgrowth of the crop consequent upon a rainfall, it is necessay to adjust the harrow to cause the teeth to cut under and backwardly. This adjustment of the harrow is provided for by our improved construction by moving the sections to the diagonal or angular positions shown by Fig. 2 and by attaching the draft-chains to the draft-eyes at the inner angles or corners of the harrow-sections, also as represented by Fig. 2. To convert the harrow represented by Fig. 1 into the harrow shown by Fig. 2 the sections 1 and 2 are spread apart or separated at their adjacent ends practically to the limit permitted by the chamfered or beveled end 38$^a$ of the beam 6 of one of the two harrow-sections, and the draft-chains 75 78 are detached from their draft-eyes and fitted to the draft-eyes at the inner adjacent corners of the harrow-sections 1 2, so as to lie alongside of the draft-chains 76 77. The pairs of parallel draft-chains are attached to the doubletrees 79 and 80, to which the teams are connected, and the harrow-sections are drawn by the teams, which are yoked or connected together, in a forward direction to cause the teeth to cut under and backwardly and to take in the whole area or surface within the limits of the two sections 1 and 2. When the harrow-sections are turned to the diagonal or the angular position represented by Fig. 2, the weight-platforms 52 and 53 remain in their relative positions to the individual harrow-sections; but said platforms are inclined oppositely to the line of draft to receive the ends of the longitudinal platform 56 for the purpose of supporting the latter in a position at right angles to the line of draft.

To pulverize extremely tight heavy land and tough heavy sod, the draft is changed from the position shown by Fig. 2 to the position represented by Fig. 3 in order to make the teeth set toward the team and to cut under the sod or surface. The position of the harrow-sections in relation to each other and the position of the weight-platforms are not changed when the harrow is adapted for cutting extremely tight, lumpy, or heavy sod; but the draft only is changed from one side of the implement to the other side thereof, and the draft is applied to the extreme outer corners instead of to the inner corners of the diagonal or angularly-arranged harrow-sections. In making the change from Fig. 2 to Fig. 3 the two pairs of draft-chains are disconnected from the two draft-eyes in the bars 3 of the harrow-sections, and said draft-chains are connected to the draft-eyes 35 and 38 on the toothed bars 6 of the harrow-sections, said draft-eyes 35 and 38 being disposed near the outer angles or corners of said harrow-sections. The pairs of draft-chains are attached to the doubletrees 79 and 80, and the teams are yoked together to cause them to pull in unison. It will be observed that the application of the draft is effected at the outer corners of the diagonal or angularly-disposed harrow-sections of the same beams to which the pivotal joint 39$^a$ is attached, and this arrangement and adaptation of the pivotal joint between the harrow-sections and the application of the draft to said beams or bars of the harrow-sections are exactly reversed to the connection of the sections and the attachment of the draft represented by Fig. 2.

To adapt the implement for cultivating or crust-breaking the ground, the transverse platforms and the longitudinal platform are removed from the harrow-sections and the latter are brought into alinement to produce the substantially oblong harrow illustrated by Fig. 4 of the drawings. The hinge connection 39$^a$ between the two harrow-sections is at the front side thereof, and the series of draft-chains 75 to 78, inclusive, are attached to the draft-eyes 35 to 38, inclusive, at regular intervals along the front side of the harrow. The draft-chains 75 76 to the harrow-sections 1 are brought together and attached to the doubletree 79, while the other pair of draft-chains 77 78 likewise converge and are attached to the doubletree 80. The teams are yoked together, and each team exerts its pull individually on one harrow-section. The tension devices are reversed from the position shown by Figs. 1 and 2 for the purpose of bringing the handles of the tension-bars within convenient reach of the driver following in rear of the machine, and each tension device is adjusted to hold the toothed bars under greater or less tension to regulate the oscillating or vibrating motion of the teeth attached to the flexibly-connected series of bars. To increase the tension on either harrow-section, the tension-bar is depressed and brought closer to the arm 20, thereby causing the opposite ends of the tension-bar and the arm to tighten the chain connections with the front and rear bars of the harrow, and thus the front and rear bars strain or pull on the link connections with the intermediate bars and restrict the rocking or oscillating movement of the series of flexibly-connected toothed bars forming the harrow-section. To ease up on the link connections and increase the freedom of motion of the toothed bars, it is only necessary for the operator to release the locking-lever and raise the tension-bar, thereby slackening the pull on the connecting-chains between the tension-bar, the arm 20, and the front and rear beams of the harrow, and the described tension device is so constructed that the operator may readily adjust the parts while the machine is in motion to increase or decrease the rigidity or flexibility of the harrow. When the ground has a hard crust, it is necessary to lower the tension-bar and restrict the motion of the toothed bars to render them practically rigid so far as their play in respect to each other is concerned, thereby causing the teeth to break through and pulverize the soil to the best advantage. When the crust of the ground is soft, the tension device is adjusted to ease up on the link connections and permit the toothed bars to have a greater freedom of motion, and this easing up of the tension device is regulated according to the condition of the ground, so that under certain adjustments of the tension device the teeth are free to flip, kick, and stir the soil, thoroughly pulverizing the same, said teeth having a vibrating back-and-forth motion which thoroughly breaks up the crust and reduces the soil to a pulveraceous condition best suited to the growing crop. A medium-sized harrow constructed in accordance with our invention and adjusted as represented by Fig. 4 is well adapted to cultivate four rows of corn at one drive across the field, and the harrow may be used on growing crops when the latter attain a certain height, not exceeding knee high.

In connection with the means for adjusting the angular harrow-section we desire to call attention to the fact that the necessary set is imparted to the toothed bars by an oblique or angular arrangement of the draft-eyes at top and bottom of the bars, and this arrangement permits each link to be connected at one end to the draft-eye on the lower part of one bar and its other end to a draft-eye attached on a higher elevation to an adjacent toothed bar.

In our harrow we may attach each series of teeth 7 to one of the bars in the ordinary way by driving or inserting the teeth at suitable intervals through the wooden bar; but under some circumstances we may employ the clamping device illustrated by Fig. 11 for securing the teeth individually to a wooden bar. This clamp consists of a base-plate 60, adapted to be rigidly secured in a suitable way to one of the vertical faces of the wooden bar, and said base-plate is provided with prongs or studs 60ª, fitted in suitable recesses in the bar. The plate is provided with a transverse opening 61, on opposite sides of which are formed the offsets, having angular notches that provide seats for one edge of the rectangular or square harrow-tooth. Said tooth passes through a vertical eye provided in an enlarged head 63 on a bolt 62, and the headed and eye-formed end of the bolt is arranged to coact with the seats of the perforated base-plate to clamp the harrow-tooth on opposite sides thereof and rigidly confine said tooth in place between the base-plate and the headed bolt. The extremity of the bolt is suitably threaded to receive a tightening-nut 64.

As thus far described our harrow has its bars or beams made of wood of the proper dimensions and weight; but we may desire to make each bar or beam of metal, as represented by Fig. 10 of the drawings. In this embodiment of the invention each bar or beam consists of two parallel lengths or sections 66 67, which accommodate between themselves a plurality of pairs of plates 68, which receive the harrow-teeth and are drawn or clamped tightly upon the same by a bar or bolts. The pair of clamping-plates 68 are made independent or separate from the sections or lengths of the bar, and said plates are interposed between the bars. The opposing faces of the plates are provided with angular notches or recesses 69, forming seats for the opposite angles or corners of the harrow-tooth. The clamping-plates are held in position between the sections or lengths of the harrow-bar by the pair of bolts 70, which pass through suitable openings in the bar-sections or links 66 67 at opposite ends of the clamping-plates 68, whereby the bolts serve to draw the bar-sections 66 67 toward each other to clamp the plates 68 firmly in place and to hold the harrow-teeth rigidly in position between and within said plate 68.

We are aware that changes in the form and proportion of parts and in the details of construction may be made by a skilled mechanic without departing from the spirit or sacrificing the advantages of our invention, and we therefore reserve the right to make such modifications as clearly fall within the scope of the invention.

Having thus described the invention, what we claim is—

1. In a harrow, the combination of the independent sections each provided with a tension device which is connected operatively with the toothed bars thereof, a single hinge connecting the contiguous corners of said sections, and shiftable draft appliances connected individually to the harrow-sections, whereby the sections may be adjusted at right angles or in parallel relation to each other and the bars of the sections may be controlled for the performance of work substantially as described, for the purpose set forth.

2. An adjustable harrow consisting of sections each having its flexibly-connected bars controlled by a tension device, a single hinge connection between adjacent corners of said harrow-sections, a plurality of draft-eyes attached at intervals to said harrow-sections, and the shiftable draft appliances connected individually and detachably to the draft-eyes of the sections and disposed on opposite sides of the hinge connection between said sections substantially as described, for the purpose set forth.

3. An adjustable harrow consisting of individual sections each having a tension device connected operatively with the bars thereof, a single hinge connection between adjacent corners of the sections, a series of draft-eyes attached to the front bars of said sections, another series of draft-eyes secured to the rear bars of the sections, and independent shiftable draft appliances connected individually to the draft-eyes on the bars of the harrow-sections, said draft appliances being disposed on opposite sides of the hinge connection between the harrow-sections, for the purpose described, substantially as set forth.

4. An adjustable harrow consisting of the individual sections each having its bars connected flexibly together, and one of said sections provided with a side bar having at its inner end the bevel or chamfer, a hinge connection between the beveled bar of one section and the corresponding bar of an adjacent section and having its pintle or rod in a plane midway between said bars at the contiguous corners of the harrow-sections, a tension device connected operatively with the bars of each harrow-section, draft-eyes applied to the bars of the individual sections at the front and rear sides of the harrow, and shiftable draft appliances connected detachably and individually to the draft-eyes of the harrow-sections, substantially as described.

5. A harrow consisting of individual sections each having its toothed bars connected flexibly together, a tension device connected to each harrow-section to regulate the link connections and the toothed bars thereof and adapted to maintain said toothed bars in either a rigid or loose condition, a single hinge connecting the contiguous corners of the harrow-sections, a series of draft-eyes attached to the harrow-sections on the front and rear sides thereof, and pairs of draft-chains connected individually to the draft-eyes of the sections and arranged on opposite sides of the hinge connection between said sections, substantially as described.

6. In a harrow, the combination with harrow-sections having flexibly-connected bars, of weight-platforms applied transversely to the individual harrow-sections, and another weight-platform resting upon the individual platforms, substantially as described.

7. In a harrow, the combination with individual harrow-sections each having a series of flexibly-connected bars, of individual weight-platforms applied transversely to the separate harrow-sections and held thereon against lateral displacement by suitable devices, and a longitudinal platform which spans the harrow-sections and is sustained by the transverse individual platforms, substantially as described.

8. In a harrow, the combination of individual sections each having a series of flexibly-connected bars and said sections hinged together for adjustment substantially as described, weight-platforms applied transversely at the central line of the separate harrow-sections, a longitudinal platform which spans the harrow-sections and rests upon the individual platforms, and draft appliances connected with the harrow-sections, the transverse and longitudinal weight-platforms being removable at will from the implement, substantially as described.

9. In a harrow, the combination with harrow-sections connected together and draft appliances attached to said harrow-sections, of the keepers fixed to the harrow-sections at front and rear thereof, the weight-platforms applied transversely to the central parts of the individual sections and detachably engaging with said keepers to be held thereby against displacement on the harrow-sections, and a longitudinal platform resting upon the transverse platform and removable therewith from the harrow, substantially as described.

10. A harrow consisting of flexible individual sections, a tension device operatively connected to each section, a single vertical hinge connecting the sections at their inner contiguous corners to adapt the sections to assume parallel or right-angular relation one to the other, and shiftable draft appliances connected individually to the sections, substantially as described.

11. A harrow consisting of flexible sections, a load-platform resting on each section, a tension device connected to each section for adjusting the bars thereof without removal of the load-platform, a single vertical hinge connecting the sections at their inner adjacent corners, and draft appliances attached individually to the respective sections, substantially as described.

12. In a harrow, a series of flexibly-connected toothed bars, combined with a tension device having a longitudinal bar connected with one toothed bar, an arm attached to the longitudinal tension-bar and to the toothed bar at the opposite side of the harrow, and an adjustable locking device between the tension-bar and the arm, substantially as described.

13. The combination with a series of flexibly-connected toothed bars, of a tension-bar connected at one end to one toothed bar, an arm hinged to the tension-bar and connected at its free ends with the opposite toothed bar, and an adjustable locking device between the tension-bar and the arm, substantially as described.

14. In a harrow, the combination with a series of flexibly-connected toothed bars, of an eyebolt attached in an elevated position to one of the toothed bars, another eyebolt attached to the opposite toothed bar on a plane below the first-named eyebolt, a tension-bar connected to one of said eyebolts, an arm connected to the other eyebolt and hinged to the tension-bar, and an adjustable locking device between the arm and tension-bar, substantially as described.

15. In a harrow, the combination with a series of flexibly-connected toothed bars, the rests attached to the toothed bars at the front and rear sides of the harrow, a tension-bar connected with one toothed bar and adapted to be sustained by one of the rests, an arm hinged to the tension-bar, connected to the opposite toothed bar and bearing upon the other rest, and an adjustable locking device between the arm and tension-bar, substantially as described.

16. In a harrow, the combination with a series of flexibly-connected bars, of a supporting block or bearing rigid with one of the toothed bars, an eyebolt secured in said supporting-block, another eyebolt attached to the opposite toothed bar and lying on a plane below the first-named eyebolt, a tension device having its members connected with the respective eyebolts, and rests fixed to the toothed bars and adapted to support the tension device, substantially as described.

17. In a harrow, the combination of a series of flexibly-connected toothed bars, an eyebolt supported on one of said bars in an elevated position, another eyebolt attached to the opposite toothed bar on a plane below the first-named eyebolt, the tension-bar connected flexibly at one end to one of said eyebolts, an arm hinged to the tension-bar and flexibly connected at its other end to the other eyebolt, a holding-segment attached to the arm, and a locking device carried by the tension-bar and adjustably engaging with said holding-segment, substantially as described.

18. In a harrow, a series of flexibly-connected bars having the oblique eyebolts or draft-eyes arranged in different elevations, and links connecting the adjacent pairs of eyebolts and toothed bars, in combination with eyebolts attached to the front and rear toothed bars on planes corresponding to the difference in elevation of the eyebolts or draft-eyes for the link connections of said bars, and a tension device connected with said eyebolts on the front and rear bars, substantially as described.

19. In a harrow, the combination of toothed bars provided with oblique passages, of draft-eyes secured in said oblique passages to partake of the inclination thereof and with the draft-eyes on adjacent bars arranged in different horizontal planes, and links connecting the draft-eyes in pairs, substantially as described.

20. In a harrow, the combination with toothed bars, of draft-eyes secured therein in oblique positions and in different horizontal planes, the adjacent pairs of draft-eyes being disposed at different elevations with respect to each other, and a series of links connecting the draft-eyes in pairs and inclined longitudinally of the implement, whereby the draft-eyes and links impart the proper set to the toothed bars, substantially as described.

21. The combination with a tooth-carrying bar, of a draft-eye having a heavy eye-formed body and a shank, said shank and body of the draft-eye being attached to the bar in an oblique or angular position with respect to the transverse axis of said bar, substantially as described.

22. In a harrow, a draft-eye consisting of a heavy body provided with a transverse eye, a shank or stem extending rearwardly from said body, and the holding-lugs integral with the body and projecting from the same side thereof as the stem or shank, substantially as described.

23. In a harrow, the combination of a tooth-carrying bar provided with an oblique or angular passage, a draft-eye having a stem or shank which passes through said passage and causes the draft-eye to partake of the oblique or angular arrangement of the passage in said toothed bar, and means for clamping the draft-eye rigidly to the bar, substantially as described.

24. A harrow consisting of the individual sections having the bars thereof connected flexibly together, a tension device for each section connected detachably to the front and rear bars thereof and reversible end for end on said section, a single hinge connection between contiguous corners of the sections, and independent shiftable draft appliances connected with the respective harrow-sections on opposite sides of the hinge connection, said draft appliances being attachable to the front or rear sides of the harrow, substantially as described.

In testimony that we claim the foregoing as our own we have hereto affixed our signatures in the presence of two witnesses.

A. W. ENGLAND.
FRANK D. ENGLAND.
COLEMAN L. RANDOLPH.

Witnesses for A. W. England:
JOHN H. SIGGERS,
HAROLD H. SIMMS.

Witnesses for F. D. England and C. L. Randolph:
SAM W. WILLIAMS,
W. A. MCGREGOR.